(12) United States Patent
Toyota

(10) Patent No.: US 10,150,512 B2
(45) Date of Patent: Dec. 11, 2018

(54) AUTOMOBILE PILLAR STRUCTURE

(71) Applicant: TOYOTA JIDOSHA KABUSHIKI KAISHA, Toyota-shi (JP)

(72) Inventor: Masaru Toyota, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/183,417

(22) Filed: Jun. 15, 2016

(65) Prior Publication Data

US 2016/0368537 A1 Dec. 22, 2016

(30) Foreign Application Priority Data

Jun. 22, 2015 (JP) ................................ 2015-125150

(51) Int. Cl.
| | | |
|---|---|---|
| *B62D 25/04* | (2006.01) | |
| *B62D 29/04* | (2006.01) | |
| *B60J 1/00* | (2006.01) | |

(52) U.S. Cl.
CPC .............. *B62D 25/04* (2013.01); *B60J 1/004* (2013.01); *B62D 29/043* (2013.01)

(58) Field of Classification Search
CPC ......... B62D 25/04; B62D 29/043; B60J 1/004
See application file for complete search history.

(56) References Cited

U.S. PATENT DOCUMENTS

| 1,784,265 | A | * | 12/1930 | Zeamans | ................ | B62D 25/04 |
| | | | | | | 296/200 |
| 6,669,275 | B2 | * | 12/2003 | Frasher | ................... | B60R 21/04 |
| | | | | | | 296/146.1 |
| 9,227,673 | B2 | * | 1/2016 | Berger | ................... | B29C 70/68 |
| 2011/0248525 | A1 | * | 10/2011 | Lundstroem | ........... | B62D 25/04 |
| | | | | | | 296/191 |
| 2015/0354927 | A1 | | 12/2015 | Jacquemont | | |

FOREIGN PATENT DOCUMENTS

| FR | 2 885 341 | A1 | 11/2006 |
| FR | 3 001 031 | A1 | 7/2014 |
| GB | 2 457 034 | A | 8/2009 |
| JP | 60-103074 | U | 7/1985 |
| JP | 64-21070 | U | 2/1989 |

(Continued)

OTHER PUBLICATIONS

Extended European Search Report dated Nov. 18, 2016 in Patent Application No. 16173093.2.

*Primary Examiner* — D Glenn Dayoan
*Assistant Examiner* — Melissa A Black
(74) *Attorney, Agent, or Firm* — Oblon, McClelland, Maier & Neustadt, L.L.P.

(57) ABSTRACT

An automobile pillar structure is provided that includes a transparent portion that configures a skeleton of a pillar of a vehicle, the transparent portion being made of transparent resin, and being disposed such that a lengthwise direction thereof coincides with a vehicle vertical direction; and a glass holding portion that is disposed at least at a vehicle width direction outer side of the transparent portion, and that holds a glass, the glass holding portion being configured such that width dimension along a direction intersecting the lengthwise direction of the transparent portion is set equal to or less than an interpupillary distance of a driver.

8 Claims, 8 Drawing Sheets

(56) References Cited

FOREIGN PATENT DOCUMENTS

| JP | 06-060580 | 8/1994 |
| JP | 08-169362 | 7/1996 |
| JP | 2006-096270 | 4/2006 |
| JP | 2006-273057 | 10/2006 |
| JP | 2013-75661 A | 4/2013 |
| JP | 2014-172497 A | 9/2014 |
| WO | WO 2010/114293 A2 | 10/2010 |
| WO | WO 2014/073498 A1 | 5/2014 |

* cited by examiner

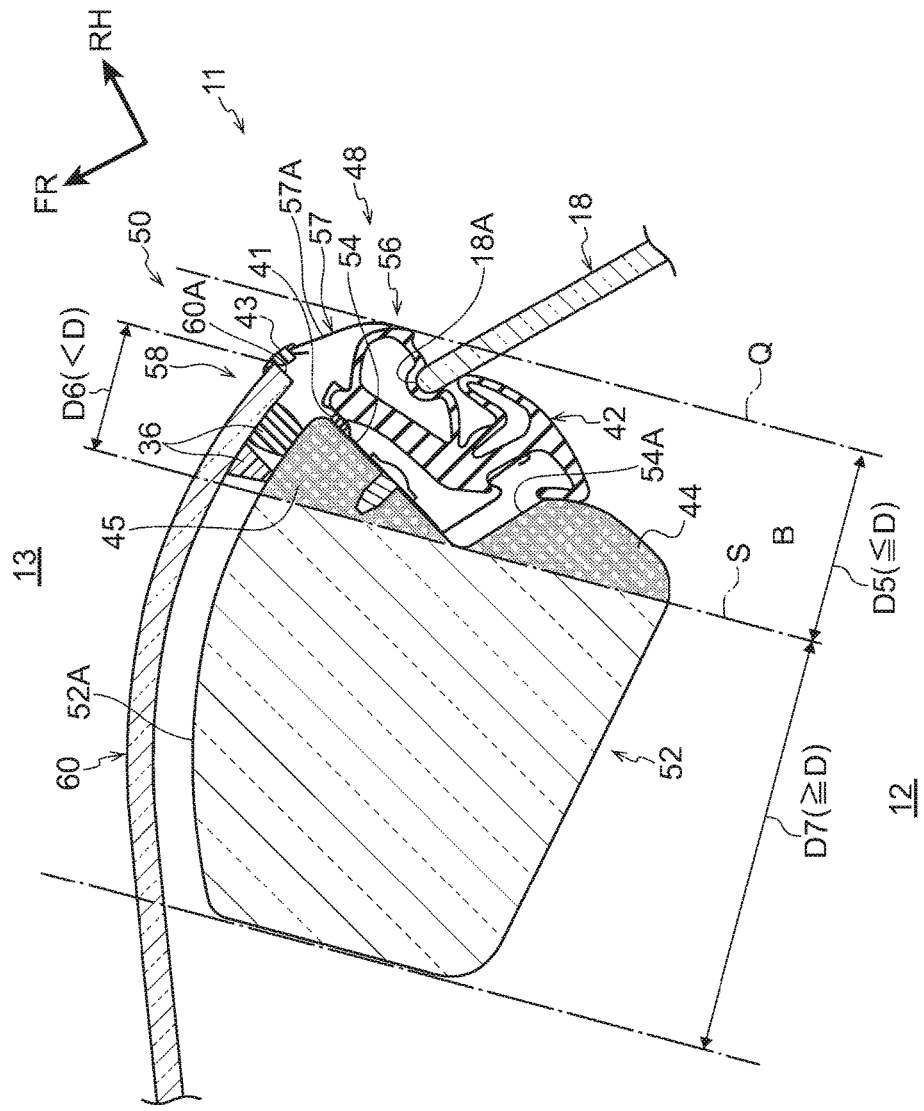

AUTOMOBILE PILLAR STRUCTURE

CROSS-REFERENCE TO RELATED APPLICATION

This application is based on and claims priority under 35 USC 119 from Japanese Patent Application No. 2015-125150 filed on Jun. 22, 2015, the disclosure of which is incorporated by reference herein.

BACKGROUND

Technical Field

The present disclosure relates to an automobile pillar structure.

Related Art

As an automobile pillar structure, for example, Japanese Patent Application Laid-open (JP-A) No. 2006-273057 discloses a technology in which a transparent member is disposed at the inner side of a holding member (glass holding portion) that configures a skeleton of a front pillar (pillar) and forms the outer shape of the front pillar, so that visibility is improved by the transparent member. The holding member is provided with a holding portion that holds a windshield and a holding portion that holds a side door glass. Furthermore, JP-A No. 2006-096270 discloses a technology in which the width dimension of a front corner member (glass holding portion) that configures a front pillar of a truck is set to 40 to 58 mm, to thereby improve visibility.

However, in these related technologies, a blind spot region is formed at least in the area corresponding to the glass holding portion. Moreover, the related technology disclosed in JP-A No. 2006-096270 basically assumes a truck, and if the front pillar is to be applied to a passenger car, it would be difficult to ensure sufficient strength and rigidity for the front pillar if the width dimension of the front pillar is 40 to 58 mm.

SUMMARY

In consideration of the circumstances described above, the present disclosure provides an automobile pillar structure that can further improve visibility while securing strength and rigidity for the pillar.

A first aspect of the present disclosure is an automobile pillar structure including: a transparent portion that configures a skeleton of a pillar of a vehicle, the transparent portion being made of transparent resin, and being disposed such that a lengthwise direction thereof coincides with a vehicle vertical direction; and a glass holding portion that is disposed at least at a vehicle width direction outer side of the transparent portion, and that holds a glass, the glass holding portion being configured such that width dimension along a direction intersecting the lengthwise direction of the transparent portion is set equal to or less than an interpupillary distance of a driver.

In the first aspect, the skeleton of the pillar of the vehicle is configured by the transparent portion whose lengthwise direction coincides with the vehicle vertical direction and which is made of transparent resin. The glass holding portion that holds the glass is disposed at least at the vehicle width direction outer side of the transparent portion, and the width dimension, along a direction intersecting the lengthwise direction of the transparent portion, of the glass holding portion is set equal to or less than the interpupillary distance of the driver.

In this way, by setting the width dimension of the glass holding portion equal to or less than the interpupillary distance of the driver, a visible region can be formed in front of the glass holding portion. Furthermore, in the present aspect, the transparent portion that configures the skeleton of the pillar is separately disposed in addition to the glass holding portion, so even when the width dimension of the glass holding portion is set equal to or less than the interpupillary distance of the driver, it is possible to secure strength and rigidity for the automobile pillar.

It should be noted that "interpupillary distance" means the distance between the center of the pupil of the right eye and the center of the pupil of the left eye. Furthermore, in relation to the glass holding portion, the aspect includes a case in which part of the transparent portion configures the glass holding portion and a case in which a glass holding portion formed separately from the transparent portion is provided integrally with the transparent portion by, for example, welding or fusing them to each other.

In this way, in the automobile pillar structure of the present aspect, visibility can be improved while securing strength and rigidity for the pillar.

In the present aspect, the glass holding portion may include a first glass holding portion that is disposed at a vehicle width direction inner side of the transparent portion and holds one vehicle width direction end portion of a first glass disposed at a cabin front portion or a cabin rear portion and a second glass holding portion that is disposed at the vehicle width direction outer side of the transparent portion and holds one vehicle front-rear direction end portion of a second glass disposed at a cabin side portion, and a width dimension, along a direction intersecting the lengthwise direction of the transparent portion, of at least one of the first glass holding portion or the second glass holding portion may be set equal to or less than the interpupillary distance of the driver.

In the above configuration, the glass holding portion may include the first glass holding portion disposed at the vehicle width direction inner side of the transparent portion and the second glass holding portion disposed at the vehicle width direction outer side of the transparent portion. Furthermore, the glass includes the first glass disposed at the cabin front portion or the cabin rear portion and the second glass disposed at the cabin side portion. One vehicle width direction end portion of the first glass is held by the first glass holding portion, and one vehicle front-rear direction end portion of the second glass is held by the second glass holding portion.

Since the width dimension of at least one of the first glass holding portion and the second glass holding portion is set equal to or less than the interpupillary distance of the driver, a visible region can be formed in front of the first glass holding portion and the second glass holding portion.

In this way, in the above configuration, the blind spot region produced by the first glass holding portion and the second glass holding portion can be narrowed and a visible region can formed in front of the first glass holding portion and the second glass holding portion.

In the present aspect, the width dimension of the transparent portion may be set equal to or greater than the interpupillary distance of the driver.

In the above configuration, by setting the width dimension of the transparent portion equal to or greater than the interpupillary distance of the driver, strength and rigidity for the pillar can be secured, and it can be ensured that the glass holding portion and the transparent portion do not coincide in the viewing region of the driver. Because of this, it can be ensured that the view seen through the transparent portion is not obstructed by the glass holding portion. That is, it can be ensured that a blind spot region is not formed by the glass holding portion, and visibility can be improved.

In this way, in the above configuration, visibility can be improved while securing strength and rigidity for the pillar.

In the present aspect, the glass holding portion may include a third glass holding portion that is disposed at the vehicle width direction outer side of the transparent portion and holds one vehicle width direction end portion of a first glass disposed at a cabin front portion or a cabin rear portion and a fourth glass holding portion that is disposed at the vehicle width direction outer side of the transparent portion, that is placed adjacent to the third glass holding portion in a vehicle front-rear direction, and that holds one vehicle front-rear direction end portion of a second glass disposed at a cabin side portion, and a width dimension, along a direction intersecting the lengthwise direction of the transparent portion, of the fourth glass holding portion may be set equal to or less than the interpupillary distance of the driver.

In the above configuration, the glass holding portion may include the third glass holding portion and the fourth glass holding portion that are disposed at the vehicle width direction outer side of the transparent portion, and the third glass holding portion and the fourth glass holding portion may be placed adjacent to each other in the vehicle front-rear direction. Furthermore, the glass may include the first glass disposed at the cabin front portion or the cabin rear portion and the second glass disposed at the cabin side portion. One vehicle width direction end portion of the first glass is held by the third glass holding portion, and one vehicle front-rear direction end portion of the second glass is held by the fourth glass holding portion.

As described above, in the above configuration, the third glass holding portion and the fourth glass holding portion are placed adjacent to each other in the vehicle front-rear direction at the vehicle width direction outer side of the transparent portion, so the glass holding portion is disposed only at one vehicle width direction end side of the pillar. For this reason, according to the above configuration, visibility can be further improved compared to a case in which the glass holding portion is disposed at both vehicle width direction end sides of the pillar.

Here, because the third glass holding portion and the fourth glass holding portion are placed adjacent to each other in the vehicle front-rear direction, the width dimension of the one of the third glass holding portion and the fourth glass holding portion that has the larger width dimension is set equal to or less than the interpupillary distance of the driver. Usually, the third glass holding portion that holds the first glass disposed at the cabin front portion or the cabin rear portion has a sealing member including an adhesive disposed on it, and a door seal that sandwiches and holds the second glass and a retainer to which the door seal is attached are disposed at the fourth glass holding portion that holds the second glass disposed at the cabin side portion. For this reason, the width dimension of the fourth glass holding portion is larger than the width dimension of the third glass holding portion. Consequently, in the above configuration, the width dimension of the fourth glass holding portion is set equal to or less than the interpupillary distance of the driver.

In this way, in the above configuration, visibility can be further improved compared to a case in which the glass holding portion is disposed at both vehicle width direction end sides of the pillar.

In the present aspect, the transparent portion may include an opaque portion that is opaquely colored and hides the glass holding portion from the driver.

In the above configuration, the opaquely colored opaque portion is provided in the transparent portion. Because of this, the glass holding portion is hidden from the driver, and it is ensured that the glass holding portion cannot be seen by the driver.

In this way, in the above configuration, it can be ensured that the beauty of the cabin interior is not marred.

BRIEF DESCRIPTION OF THE DRAWINGS

Exemplary embodiments of the present disclosure will be described in detail based on the following figures, wherein:

FIG. 6 is a sectional view, as cut along line 3-3 of FIG. 2, showing an automobile pillar structure pertaining to a second embodiment.

DETAILED DESCRIPTION

Figure 1:
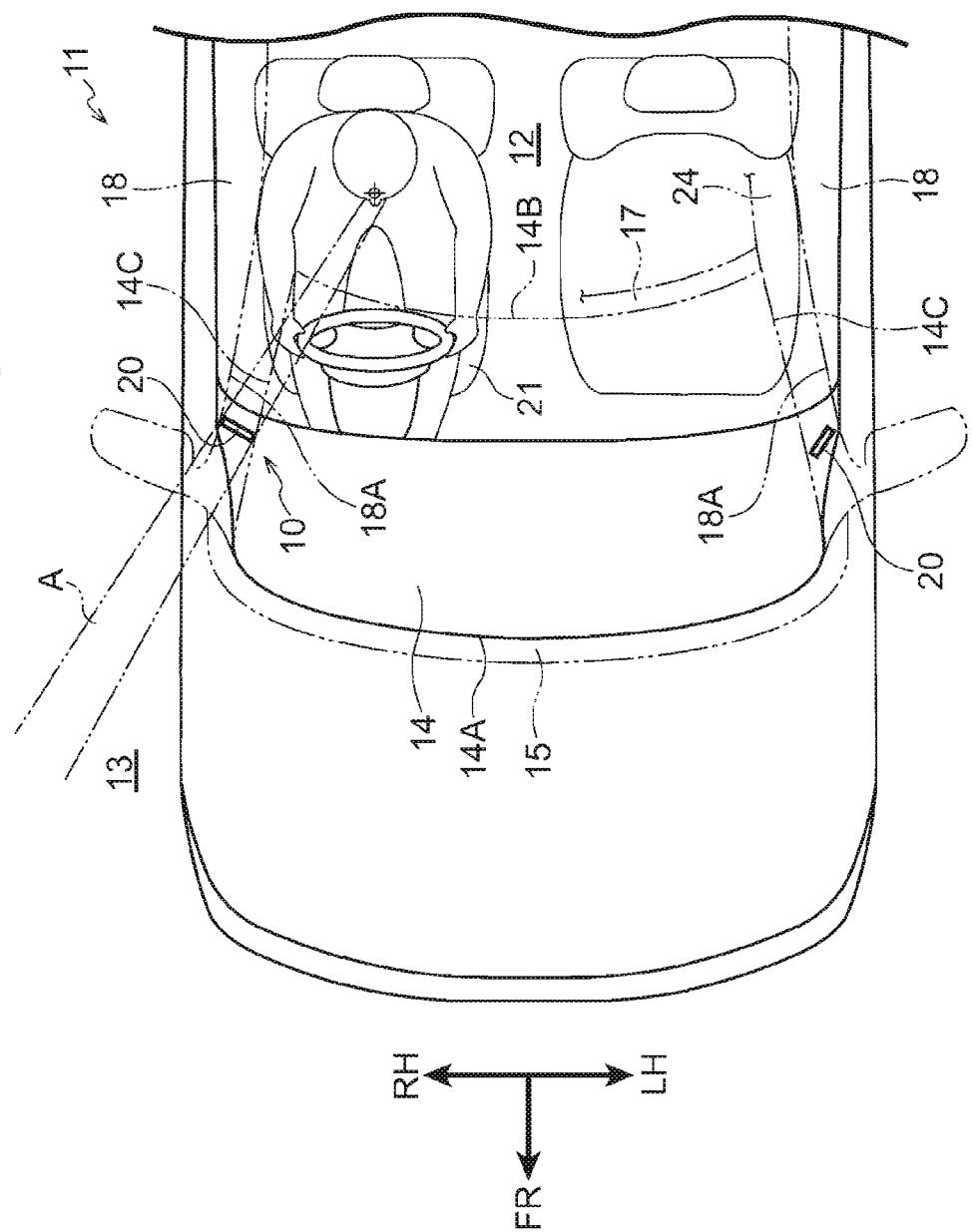
FIG. 1 is a plan view, seen from above a vehicle, of a cabin interior of an automobile to which automobile pillar structures pertaining to the embodiments have been applied.

Automobile pillar structures pertaining to embodiments will be described using the drawings. It should be noted that arrow FR shown in the drawings indicates a vehicle forward direction, arrow UP indicates a vehicle upward direction, and arrow RH indicates a vehicle rightward direction.

First Embodiment

Configuration of Automobile Pillar Structure

First, the configuration of an automobile pillar structure 10 pertaining to a first embodiment will be described.

As shown in FIG. 1, a transparent plate-like windshield 14 that serves as a first glass is disposed at a front portion of a cabin interior 12 of an automobile 11 to which the automobile pillar structure 10 pertaining to the present embodiment has been applied.

Figure 2:
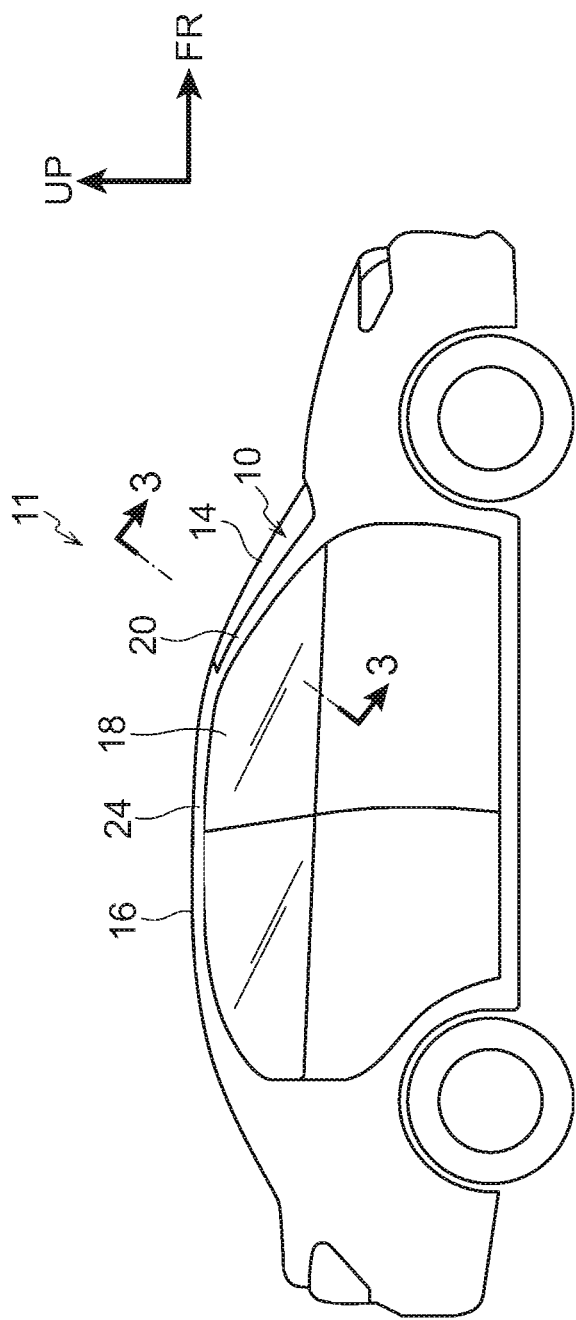
FIG. 2 is a side view showing the automobile to which the automobile pillar structures pertaining to the embodiments have been applied.

The windshield 14 has a curved shape whose vehicle width direction central portion swells in the vehicle forward direction, and the windshield 14 is placed sloping in the vehicle rearward direction toward the vehicle upward direction. A lower end portion 14A of the windshield 14 is fixed by an adhesive (not illustrated in the drawings) to a cowl 15 disposed along the vehicle width direction at an upper end portion of a non-illustrated dash panel that configures the front portion of the cabin interior 12. An upper end portion 14B of the windshield 14 is fixed by an adhesive (not illustrated in the drawings) to a front header 17 disposed along the vehicle width direction at a front end portion of a roof 16 (see FIG. 2) that configures an upper portion of the cabin interior 12.

A transparent plate-like side door glass 18 that serves as a second glass is disposed at side portions of the cabin interior 12 of the automobile 11. A front pillar 20 is disposed between vehicle front-rear direction front end portions 18A of the side door glasses 18 and vehicle width direction outer end portions 14C of the windshield 14. The front pillar 20 is placed sloping in the vehicle rearward direction toward the vehicle upward direction. Usually the front pillar 20 is a member that forms a blind spot region A with respect to an occupant seated in a seat 21.

Here, the front pillar 20 will be described.

Figure 3:
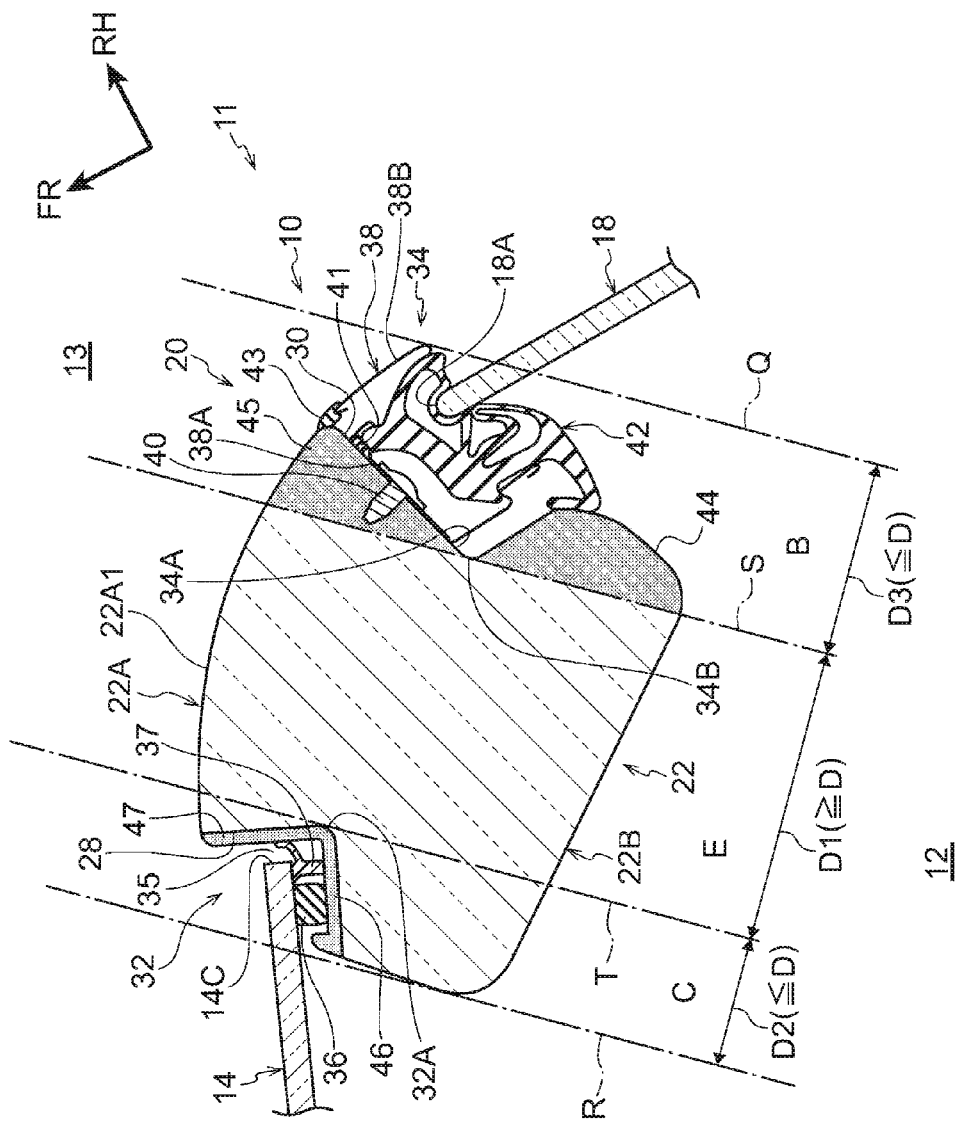
FIG. 3 is a sectional view, as cut along line 3-3 of FIG. 2, showing an automobile pillar structure pertaining to a first embodiment.

As shown in FIG. 1 and FIG. 3, the front pillar 20 is, for example, made of transparent reinforced resin such as polycarbonate or acryl. A transparent portion 22 that is a substantially rectangular shaped solid pillar, as seen in a plan sectional view, configures a skeleton of the front pillar 20, and the front pillar 20 is placed along the vehicle vertical direction.

As an example, non-illustrated nuts are disposed at the upper end portion and the lower end portion of the transparent portion 22, and one end side of each of non-illustrated brackets are attached to the transparent portion 22 via the nuts. The brackets are made of iron, steel, or the like and formed in plate shapes, and the other end side of the bracket attached to the upper end portion of the transparent portion 22 is fixed in the vehicle width direction of the roof 16 by welding or the like to a roof side rail 24 (see FIG. 2) that is made of iron, steel, or the like and extends in the vehicle front-rear direction. The other end side of the bracket attached to the lower end portion of the transparent portion 22 is fixed by welding or the like to the cowl 15 or the like made of iron, steel, or the like. In this way, the front pillar 20 made of resin is fixed to the vehicle body skeleton, such as the roof side rail 24 or the cowl 15 made of metal.

As shown in FIG. 3, cutout portions 28 and 30, cut out in a substantially L-shape as seen in a plan sectional view, are disposed in both vehicle width direction sides of a front portion 22A of the transparent portion 22, and the vehicle width direction dimension of the front portion 22A of the transparent portion 22 is narrower than that of a rear portion 22B. The cutout portions 28 and 30 are disposed along the substantially entire lengthwise direction (vehicle vertical direction). A glass holding portion 32 that serves as a first glass holding portion is configured as a result of the cutout portion 28 being formed. Likewise, a glass holding portion 34 that serves as a second glass holding portion is configured as a result of the cutout portion 30 being formed.

An adhesive 36, such as a urethane sealant, is directly applied to the glass holding portion 32, and the vehicle width direction outer end portion 14C side of the windshield 14 is held in the glass holding portion 32 via the adhesive 36. A front surface 22A1 of the transparent portion 22 is formed in a curved shape in substantial conformity to the shape of the windshield 14, and the transparent portion 22 is set such that a continuous curved surface is formed between the transparent portion 22 and the windshield 14 as seen in a plan sectional view.

Furthermore, the adhesive 36, which has the ability to expand and contract, seals the space between the windshield 14 and the front pillar 20, and utilizes its ability to expand and contract to absorb differences in expansion and contraction between the windshield 14 and the front pillar 20 caused by changes in air temperature. Moreover, a molding 37 is disposed in a gap 35 between the vehicle width direction outer end portion 14C of the windshield 14 and the glass holding portion 32, so that the gap 35 is filled with the molding 37.

A retainer 38, formed by bending a strip of stainless steel or the like, is fixed to the glass holding portion 34, and the retainer 38 has a substantially U-shape whose vehicle width direction outer side is open as seen in a plan sectional view. Additionally, a bottom wall 38A that configures part of the retainer 38 is fixed via a screw 40 to a vertical wall 34A, which configures part of the glass holding portion 34 and is formed along the vehicle front-rear direction.

Furthermore, a door seal 42 made of an elastic member such as ethylene propylene rubber (EPDM) is attached to the retainer 38, and the front end portion 18A of the side door glass 18 is held in the glass holding portion 34 via the door seal 42. Because of the door seal 42, the airtightness of the cabin interior 12 is maintained.

A front wall 38B of the retainer 38 is set such that a continuous curved surface is formed between the front wall 38B and the front surface 22A1 of the transparent portion 22. A seal member 43, made of polyvinyl chloride or the like, is disposed at the transparent portion 22 side of the front wall 38B of the retainer 38, so that the gap between the front wall 38B of the retainer 38 and the front surface 22A1 of the transparent portion 22 is filled. At the front wall 38B side of the bottom wall 38A of the retainer 38, a seal member 41, made of a sponge or the like, is disposed between the bottom wall 38A and the vertical wall 34A of the glass holding portion 34, so that the gap between the bottom wall 38A of the retainer 38 and the vertical wall 34A of the glass holding portion 34 is filled. The airtightness of the cabin interior 12 is also maintained by these seal members 41 and 43.

Here, in the present embodiment, a width dimension D1 along a direction substantially orthogonal to the lengthwise direction of the transparent portion 22 is set equal to or greater than an interpupillary distance D of a driver. It should be noted that "interpupillary distance" means the distance between the center of the pupil of a right eye P1 and the center of the pupil of a left eye P2 and, for example, is about 60 to 65 mm in a Japanese adult. Furthermore, width dimensions D2 and D3, along a direction substantially orthogonal to the lengthwise direction of the transparent portion 22, of the glass holding portions 32 and 34 are each set equal to or less than the interpupillary distance D of the driver.

Figure 4A:
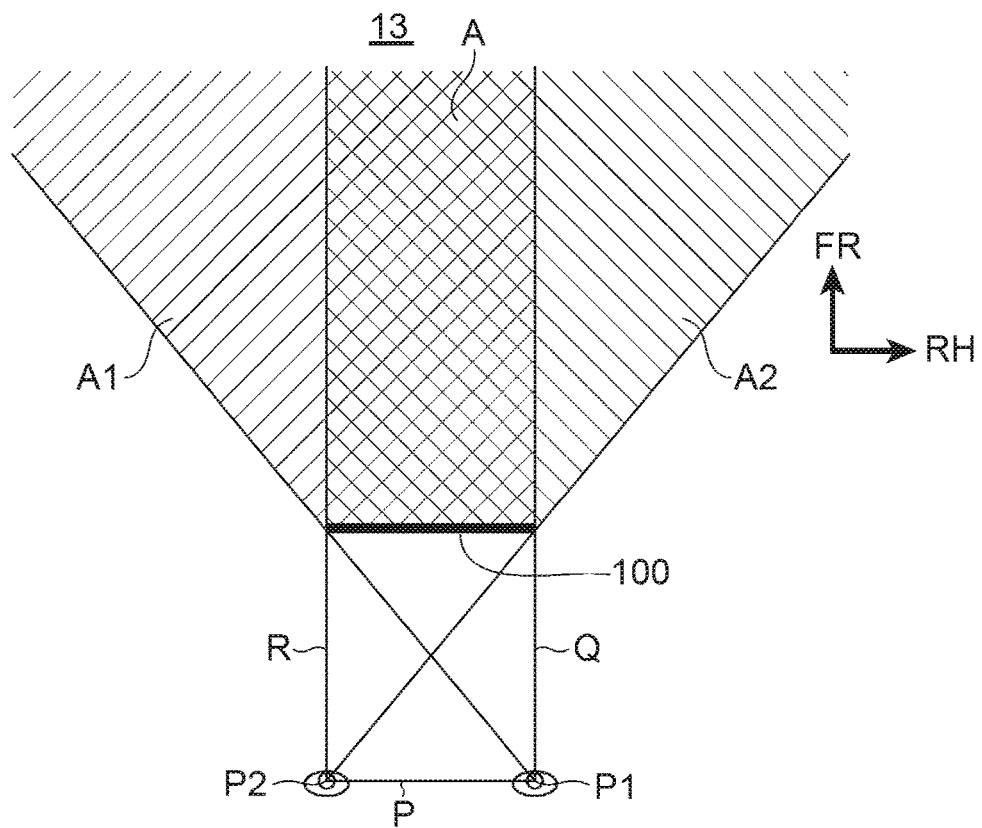
FIG. 4A shows a comparative example of the operation of the automobile pillar structure pertaining to the embodiment shown in FIG. 4B.

As shown in FIG. 4A, in relation to a front pillar 100, P denotes an eye baseline joined by the right eye P1 and the left eye P2 that serve as eye points of the driver, Q denotes a straight line that passes through the right eye P1 and is substantially orthogonal to the eye baseline P, and R denotes a straight line that passes through the left eye P2 and is substantially orthogonal to the eye baseline P. The eye baseline P, the straight line Q, and the straight line R are lines that pass through the center of the pupil of the right eye P1 and the center of the pupil of the left eye P2.

As shown in FIG. 3, B denotes a region formed between the straight line Q and a straight line S, which is parallel to the straight line Q and passes through a vehicle width direction inner edge portion 34B of the glass holding portion 34. That is, the region B is a region that exists at the vehicle width direction outer side of the straight line S in the transparent portion 22. The region B is a region in which the glass holding portion 34 is visible to the driver through the transparent portion 22.

For this reason, in the region B, an opaque portion 44 is disposed in the transparent portion 22 at the cabin interior 12 side of the glass holding portion 34, and an opaque portion 45 is disposed in the transparent portion 22 at a cabin exterior 13 side of the glass holding portion 34. These opaque portions 44 and 45 are opaquely colored so that the glass holding portion 34 cannot be seen by the driver.

C denotes a region formed between the straight line R and a straight line T, which is parallel to the straight line R and passes through a vehicle width direction outer edge portion 32A of the glass holding portion 32. That is, the region C is a region that exists at the vehicle width direction inner side of the straight line T in the transparent portion 22. The region C is a region in which the glass holding portion 32 is visible to the driver through the transparent portion 22.

For this reason, in the region C, an opaque portion 46 is disposed in the transparent portion 22 at the cabin interior 12 side of the glass holding portion 32, in a section contacting the glass holding portion 32. Furthermore, an opaque portion 47 is disposed at the cabin exterior 13 side of the glass holding portion 32, in a section contacting the glass holding portion 32. These opaque portions 46 and 47 are opaquely colored so that the glass holding portion 32 cannot be seen by the driver.

The opaque portions 44 and 45 are disposed along substantially the entire region B in the transparent portion 22, but opaque portions 46 and 47 may be disposed in only the sections contacting the glass holding portion 32. This is because the region in which the viewing region of the driver and the glass holding portions 32 and 34 coincide becomes the blind spot region A (see FIG. 1), so the blind spot region A increases when opaque portions are formed in regions outside the blind spot region A. For this reason, the regions of the opaque portions are appropriately changed depending on the shapes and so forth of the glass holding portions 32 and 34.

(Operation and Effects of Automobile Pillar Structure)

Next, the operation and effects of the automobile pillar structure 10 pertaining to the first embodiment will be described.

As shown in FIG. 1 and FIG. 3, in the present embodiment, the skeleton of the front pillar 20 is configured by the transparent portion 22 that has a substantially rectangular pillar shape, the glass holding portion 32 is disposed at the vehicle width direction inner side of the transparent portion 22, and the glass holding portion 34 is disposed at the vehicle width direction outer side of the transparent portion 22.

Usually, as shown in FIG. 4A, the front pillar 100 forms the blind spot region A. In contrast, in the present embodiment, as shown in FIG. 3, the width dimensions D2 and D3 of the glass holding portions 32 and 34 that configure part of the front pillar 20 are set equal to or less than the interpupillary distance D of the driver.

Figure 4B:
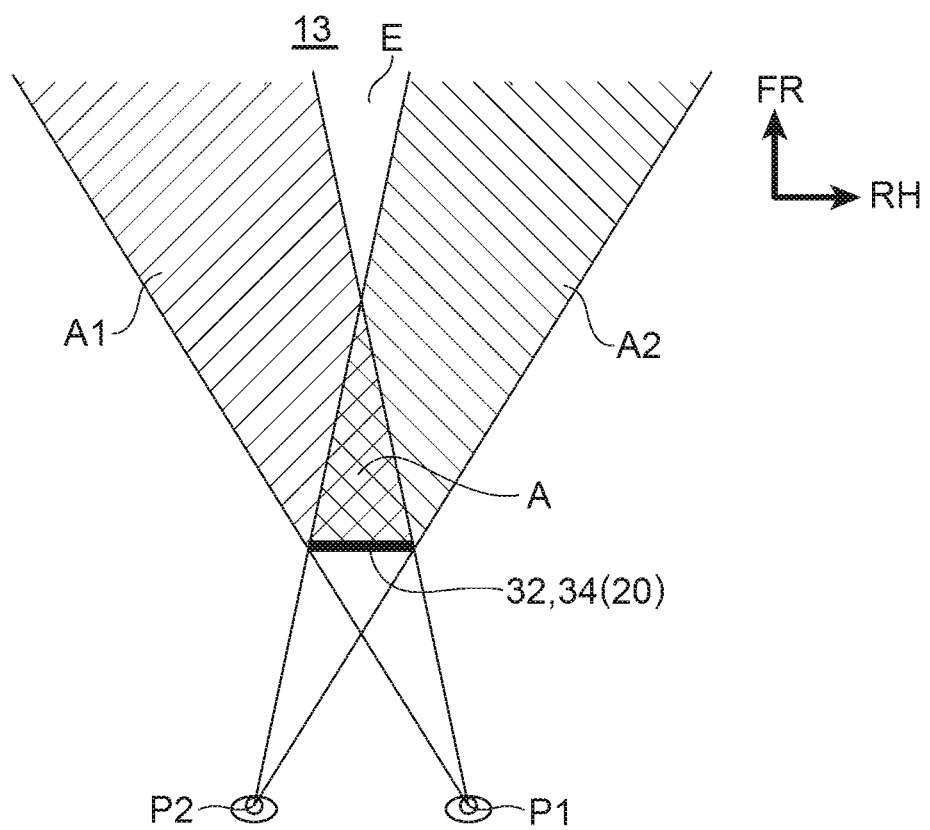
FIG. 4B is an explanatory drawing for describing the operation of the automobile pillar structure pertaining to the embodiments.

Because of this, in the present embodiment, as shown in FIG. 4B, a visible region E can be formed in front of the glass holding portions 32 and 34. Consequently, the cabin exterior 13 at the opposite side of the driver across the front pillar 20 can be seen, and the view of the driver is kept from being obstructed by the front pillar 20. The blind spot region A is a section in which a blind spot region A1 of the right eye P1 of the driver and a blind spot region A2 of the left eye P2 of the driver coincide.

Moreover, in the present embodiment, as shown in FIG. 3, in the front pillar 20, the transparent portion 22 that has a rectangular pillar shape and configures the skeleton of the front pillar 20 is separately disposed in addition to the glass holding portions 32 and 34. Because of this, even when the width dimensions D2 and D3 of the glass holding portions 32 and 34 are set equal to or less than the interpupillary distance D of the driver, strength and rigidity for the front pillar 20 can be secured. That is, according to the present embodiment, visibility can be further improved while securing strength and rigidity for the front pillar 20.

Figure 5A:
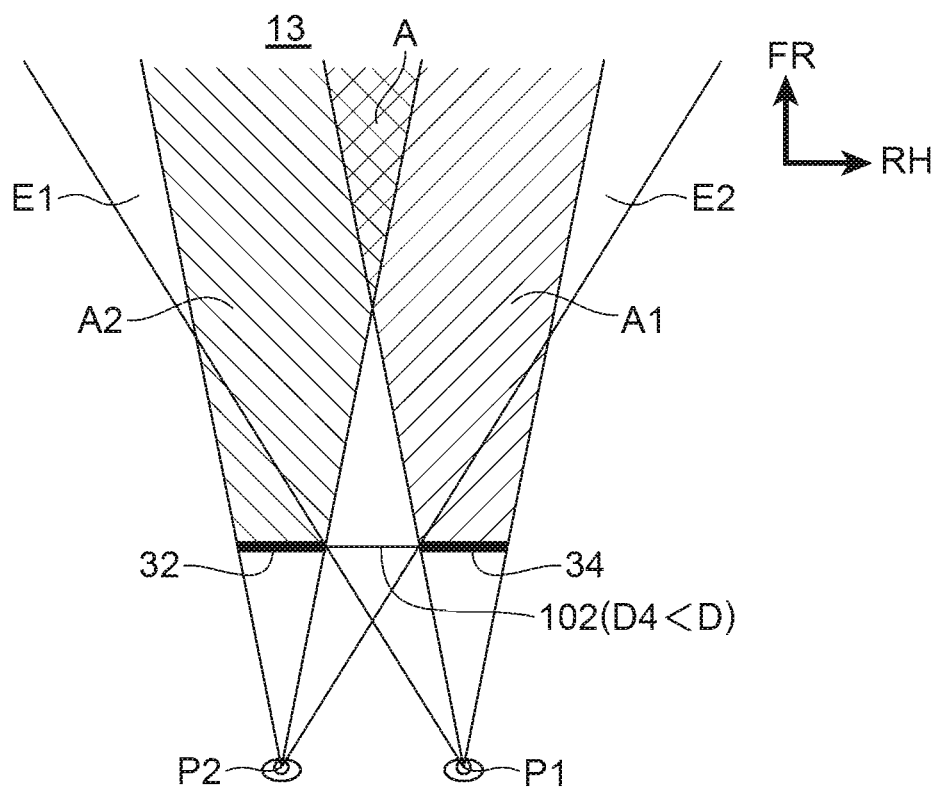
FIG. 5A shows a comparative example of the operation of the automobile pillar structure pertaining to the embodiment shown in FIG. 5B.

In the present embodiment, as shown in FIG. 3, the width dimension D1 of the transparent portion 22 is set equal to or greater than the interpupillary distance D of the driver. As shown in FIG. 5A, in a case in which a width dimension D4 of a transparent portion 102 is set less than the interpupillary distance D of the driver, the glass holding portions 32 and 34 and the transparent portion 102 coincide in a viewing region E of the driver (a viewing region E1 of the right eye P1 and a viewing region E2 of the left eye P2), and a blind spot region A is formed in front of the transparent portion 102.

Figure 5B:
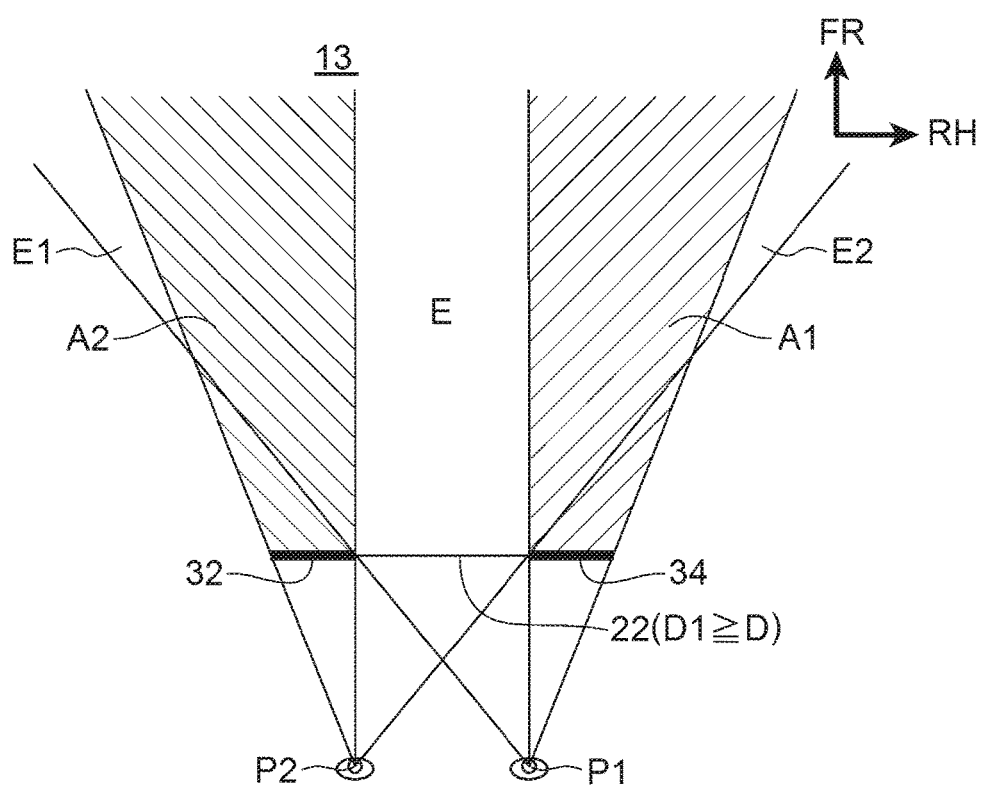
FIG. 5B is an explanatory drawing for describing the operation of the automobile pillar structure pertaining to the embodiments.

However, in the present embodiment, as mentioned above, the width dimension D1 of the transparent portion 22 shown in FIG. 3 is set equal to or greater than the interpupillary distance D of the driver. For this reason, in the present embodiment, as shown in FIG. 5B, it can be ensured that the glass holding portions 32 and 34 and the transparent portion 22 do not coincide in the viewing region E of the driver.

Because of this, it can be ensured that the view seen through the transparent portion 22 is not obstructed by the glass holding portions 32 and 34. That is, it is ensured that the blind spot region A (see FIG. 5A) is not formed by the glass holding portions 32 and 34, and visibility can be improved. Consequently, according to the present embodiment, visibility can be further improved while securing strength and rigidity for the front pillar 20.

Furthermore, in the present embodiment, the cutout portion 28 is formed in the transparent portion 22, and the glass holding portion 32 is configured by the cutout portion 28. That is, the adhesive 36 is directly applied to the transparent portion 22 that configures the glass holding portion 32, and the windshield 14 is held in the glass holding portion 32.

For this reason, compared to a case in which a non-illustrated glass holding member is interposed between the transparent portion 22 and the windshield 14, the blind spot region A (see FIG. 1) can be narrowed and the visibility can be improved. Furthermore, the number of parts is reduced, so the vehicle body mass can be reduced and costs can be reduced.

Moreover, in the present embodiment, as shown in FIG. 3, the opaque portions 44 and 45 are disposed in the region B in the transparent portion 22 of the front pillar 20, and the opaque portions 46 and 47 are disposed in the region C.

Usually, when the glass holding portions 32 and 34 are disposed in the transparent portion 22, the glass holding portions 32 and 34 are visible from the cabin interior 12 side and the cabin exterior 13 side, and there is the potential for the beauty being marred. However, in the present embodiment, in the region C in which the glass holding portion 32 is visible to the driver through the transparent portion 22, the opaque portions 46 and 47 are disposed at the cabin interior 12 side and the cabin exterior 13 side of the glass holding portion 32, respectively. Furthermore, in the region B in which the glass holding portion 34 is visible to the driver through the transparent portion 22, the opaque portions 44 and 45 are disposed at the cabin interior 12 side and the cabin exterior 13 side of the glass holding portion 34, respectively.

Because of this, even if the cabin interior 12 side and the cabin exterior 13 side of the glass holding portions 32 and 34 are transparent, it is ensured that the glass holding portions 32 and 34 cannot be seen by the driver or from the outside. For this reason, it can be ensured that the beauty as seen from the cabin interior 12 or the outside is not marred. Furthermore, the design of the cabin interior 12 and the outside can be improved by coloring the transparent portion 22.

Other Embodiments

In the present embodiment, as shown in FIG. 3, the cutout portions 28 and 30 are formed in parts of the transparent portion 22, and the glass holding portions 32 and 34 are configured by the cutout portions 28 and 30, respectively. That is, in the present embodiment, an example has been described where the glass holding portions 32 and 34 are formed in the transparent portion 22. However, the embodiment is not limited to this.

For example, although it is not illustrated in the drawings, the transparent portion and the glass holding portions 32 and 34 may be formed as independent members and integrated by, for example, fusing or fastening them to each other. That is, the glass holding portions 32 and 34 may be disposed adjacent to the vehicle width direction inner side and outer side of the transparent member 22, respectively.

Furthermore, in the present embodiment, the transparent portion 22 has a substantially rectangular pillar shape, and the front surface 22A1 of the transparent portion 22 is formed in a curved shape in substantial conformity to the shape of the windshield 14. However, the transparent portion 22 is not limited to this. For example, although it is not illustrated in the drawings, the transparent portion 22 may be formed by a thick-walled transparent plate having the same plate thickness. Furthermore, in the present embodiment, it suffices for the transparent portion 22 to be solid, and the cross-sectional shape thereof is not particularly limited.

Moreover, in the present embodiment, the width dimensions D2 and D3 of the glass holding portions 32 and 34 are each set equal to or less than the interpupillary distance D of the driver. However, it suffices for the width dimension of either one of the glass holding portions 32 and 34 to be set equal to or less than the interpupillary distance D of the driver.

Usually, the glass holding portion 32 that holds the windshield 14 has the adhesive 36 disposed thereon, and the door seal 42 that sandwiches and holds the front end portion 18A of the side door glass 18 is disposed together with the retainer 38 on the glass holding portion 34 that holds the side door glass 18. Consequently, the width dimension D3 of the glass holding portion 34 is larger than the width dimension D2 of the glass holding portion 32.

For this reason, by setting the width dimension D3 of the glass holding portion 34 equal to or less than the interpupillary distance D of the driver, the blind spot region A (see FIG. 1) can be narrowed more than in a case in which the width dimension D2 of the glass holding portion 32 is set equal to or less than the interpupillary distance D of the driver.

Furthermore, in the present embodiment, the opaque portions 46 and 47 are disposed at the cabin interior 12 side and the cabin exterior 13 side of the glass holding portion 32, and the opaque portions 44 and 45 are disposed at the cabin interior 12 side and the cabin exterior 13 side of the glass holding portion 34. However, it suffices at least for the opaque portion 46 to be disposed on the glass holding portion 32 and for the opaque portion 44 to be disposed on the glass holding portion 34. Because of this, it can be ensured that the beauty of the cabin interior 12 is not marred. Moreover, from the standpoint of further improving visibility while securing strength and rigidity for the front pillar 20, the opaque portions are not invariably necessary.

Second Embodiment

Next, a second embodiment will be described. It should be noted that, below, only sections that are different from those of the first embodiment will be described, and regarding sections that are the same as those of the first embodiment, the same reference signs are assigned thereto and detailed description thereof is omitted.

(Configuration of Automobile Pillar Structure)

First, the configuration of an automobile pillar structure 48 pertaining to the second embodiment will be described.

As shown in FIG. 3, in the front pillar 20 that configures the automobile pillar structure 10 pertaining to the first embodiment described above, the glass holding portions 32 and 34 are disposed at both vehicle width direction sides of the transparent portion 22. In contrast, as shown in FIG. 6, in a front pillar 50 that configures the automobile pillar structure 48 pertaining to the second embodiment, glass holding portions 56 and 58 are disposed at the vehicle width direction outer side of a transparent portion 52.

The glass holding portion 58 that serves as an example of a first glass holding portion is disposed on the vehicle width direction inner side and on the vehicle front side of the glass holding portion 56 that serves as a second glass holding portion. A retainer 57, formed by bending a strip of stainless steel or the like, is fixed to the glass holding portion 56, and a front wall 57A positioned at the vehicle front-rear direction front portion of the retainer 57 is placed in a position in which the front wall 57A projects from a front surface 52A of the transparent portion 52.

The glass holding portion 58 is disposed at the front surface 52A of the transparent portion 52, and the glass holding portion 58 and the glass holding portion 56 are placed adjacent to each other in the vehicle front-rear direction. Furthermore, width dimensions D5 and D6 of the glass holding portions 56 and 58 are each set equal to or less than the interpupillary distance D of the driver.

Here, because the glass holding portion 56 and the glass holding portion 58 are placed adjacent to each other in the vehicle front-rear direction, one of the glass holding portion 56 and the glass holding portion 58 that has the larger width dimension is set equal to or less than the interpupillary distance D of the driver.

As mentioned above, the width dimension D5 of the glass holding portion 56 that holds the side door glass 18 is larger than the width dimension of the glass holding portion 58 that holds a windshield 60. For this reason, by setting the width dimension D5 of the glass holding portion 56 equal to or less than the interpupillary distance D of the driver, inevitably the width dimension D6 of the glass holding portion 58 is made less than the interpupillary distance D of the driver.

Furthermore, a width dimension D7 of the transparent portion 52 is set equal to or greater than the interpupillary distance D of the driver. However, in the present embodiment, because glass holding portions that obstruct the view are not disposed at both vehicle width direction sides of the transparent portion 52, the width dimension D7 may be less than the interpupillary distance D of the driver.

As mentioned above, the front wall 57A of the retainer 57 is placed in a position in which it projects from the front wall 52A of the transparent portion 52. Further, the front wall 57A of the retainer 57 is placed at the vehicle width direction outer side of an outer end portion 60A of the windshield 60. Because of this, it is ensured that the outer end portion 60A of the windshield is not exposed to the outside as seen in a vehicle side view.

The seal member 43, made of polyvinyl chloride or the like, is disposed at the windshield 60 side of the front wall 57A of the retainer 57, so that the space between the front wall 57A of the retainer 57 and the windshield 60 is filled.

(Operation and Effects of Automobile Pillar Structure)

Next, the operation and effects of the automobile pillar structure 48 pertaining to the second embodiment will be described.

As shown in FIG. 6, in the front pillar 50 in the present embodiment, the glass holding portions 56 and 58 are disposed at the vehicle width direction outer side of the transparent portion 52, and the glass holding portion 56 and the glass holding portion 58 are placed adjacent to each other in the vehicle front-rear direction. That is, in the present embodiment, the glass holding portions 56 and 58 are disposed only at the vehicle width direction outer side of the front pillar 50.

Consequently, according to the present embodiment, visibility can be improved compared to a case in which, as shown in FIG. 3, the glass holding portions 32 and 34 are disposed at both vehicle width direction end sides of the front pillar 20.

In the above embodiments, as shown in FIG. 1, a configuration has been described in which the automobile pillar structure 10 is applied to the front pillar 20 on the driver seat side between the windshield 14 disposed at the cabin front portion and the side door glass 18 disposed at the cabin side portion. However, embodiments are limited to this. For example, the automobile pillar structure 10 may be applied to the front pillar 20 on the front passenger seat side. Furthermore, although it is not illustrated in the drawings, the automobile pillar structure 10 may be applied to rear pillars disposed between a rear windshield disposed at the cabin rear portion and side door glasses disposed at the cabin side portions.

What is claimed is:

1. An automobile pillar structure comprising:
   a transparent portion that configures a skeleton of a pillar of a vehicle, the transparent portion being made of transparent resin, and being disposed such that a lengthwise direction thereof coincides with a vehicle vertical direction; and
   a glass holding portion that is disposed at least at a vehicle width direction outer side of the transparent portion, and that holds a glass, the glass holding portion being configured such that width dimension along a direction intersecting the lengthwise direction of the transparent portion is set equal to or less than about 65 mm,
   wherein a width dimension of the transparent portion is set equal to or greater than about 60 mm.

2. The automobile pillar structure according to claim 1, wherein the glass holding portion comprises:
   a first glass holding portion that is disposed at a vehicle width direction inner side of the transparent portion and holds one vehicle width direction end portion of a first glass disposed at a cabin front portion or a cabin rear portion, and
   a second glass holding portion that is disposed at the vehicle width direction outer side of the transparent portion and holds one vehicle front-rear direction end portion of a second glass disposed at a cabin side portion, and
   a width dimension, along a direction intersecting the lengthwise direction of the transparent portion, of at least one of the first glass holding portion or the second glass holding portion is set equal to or less than the interpupillary distance of the driver.

3. The automobile pillar structure according to claim 1, wherein the glass holding portion comprises:
   a third glass holding portion that is disposed at the vehicle width direction outer side of the transparent portion and holds one vehicle width direction end portion of a first glass disposed at a cabin front portion or a cabin rear portion, and
   a fourth glass holding portion that is disposed at the vehicle width direction outer side of the transparent portion, that is placed adjacent to the third glass holding portion in a vehicle front-rear direction, and that holds one vehicle front-rear direction end portion of a second glass disposed at a cabin side portion, and
   a width dimension, along a direction intersecting the lengthwise direction of the transparent portion, of the fourth glass holding portion is set equal to or less than the interpupillary distance of the driver.

4. The automobile pillar structure according to claim 1, wherein the transparent portion comprises an opaque portion that is opaquely colored and hides the glass holding portion from the driver.

5. The automobile pillar structure according to claim 1, wherein a front portion of the transparent portion includes a cutout portion disposed on the vehicle direction outer side of the transparent portion, the cutout portion is disposed along an entire lengthwise direction of the transparent portion, and the glass holding portion is configured as a result of the cutout portion being formed.

6. The automobile pillar structure according to claim 5, wherein the cutout portion presents a substantially L-shape in a plan sectional view.

7. The automobile pillar structure according to claim 1, wherein the glass holding portion comprises:
   a first glass holding portion that holds one vehicle width direction end portion of a first glass disposed at a cabin front portion or a cabin rear portion, and
   a second glass holding portion that holds one vehicle front-rear direction end portion of a second glass disposed at a cabin side portion, and
   wherein a width dimension, along a direction intersecting the lengthwise direction of the transparent portion, of at least one of the first glass holding portion or the second glass holding portion is set equal to or less than about 65 mm.

8. The automobile pillar structure according to claim 4, wherein a total width dimension of the width dimensions of the glass holding portion and the opaque portion along a direction intersecting the lengthwise direction of the transparent portion is set equal to or less than about 65 mm.

\* \* \* \* \*